June 15, 1965 F. H. LAISHLEY 3,189,759
POWER CONTROL CIRCUIT
Filed Sept. 10, 1962
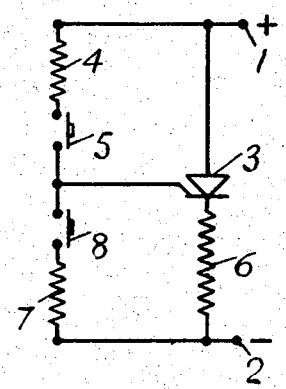

United States Patent Office 3,189,759
Patented June 15, 1965

3,189,759
POWER CONTROL CIRCUIT
Frederick Herbert Laishley, Solihull, England, assignor to Joseph Lucas (Industries) Limited, Birmingham, England
Filed Sept. 10, 1962, Ser. No. 222,378
Claims priority, application Great Britain, Sept. 18, 1961, 33,318/61
1 Claim. (Cl. 307—88.5)

The object of this invention is to provide a power control circuit in a convenient form.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property, a convenient method of manufacturing a switchable rectifier being described in pending application No. 211,674 filed July 23, 1962.

A power control circuit in accordance with the invention comprises in combination first and second terminals adapted for connection to a source of power so as to be of relatively positive and negative polarity respectively, a switchable rectifier having its anode connected to the first terminal and its cathode connected to the second terminal through a resistor, a first normally open switch and a second resistor connected in series between the gate of the switchable rectifier and the first terminal, and a second normally open switch and a third resistor connected in series between the gate and the second terminal.

An example of the invention is illustrated in the accompanying drawing.

Referring to the drawing, there are provided first and second terminals 1, 2 adapted for connection to a source of power so as to be of relatively positive and negative respectively. The terminal 1 is connected to the anode of a switchable rectifier 3 and, through a first resistor 4 and a first normally open switch 5 in series to the gate of the switchable rectifier 3. The terminal 2 is connected to the cathode of the switchable rectifier 3 through a load 6, and to the gate through a second resistor 7 and a second normally open switch 8 in series.

The arrangement is such that closing of the switch 5 switches on the switchable rectifier, which will then continue to conduct when the switch 5 is re-opened, but can be switched off by momentarily closing the switch 8. The operation is unaffected if the load 6 is placed in the anode circuit, provided that a suitable resistor is inserted between the cathode of the rectifier 3 and terminal 2.

Having thus described my invention what I claim as new and desire to secure by Letters Patent is:

A power control circuit comprising in combination a positive supply terminal and a negative supply terminal, a semi-conductor switchable rectifier having an anode, a cathode and a gate, said switchable rectifier being switched on by a positive pulse supplied between its gate and cathode and being switched off by a negative pulse supplied between its gate and cathode, means connecting the anode of said switchable rectifier to said positive terminal, a resistive load through which the cathode of said switchable rectifier is connected to said negative terminal, a series circuit connected between the gate of said switchable rectifier and said positive terminal, said series circuit including a first normally open switch and a resistor, and a second series circuit connected between the gate of said switchable rectifier and said negative terminal, said second series circuit including a second normally open switch and a resistor, momentarily closing of said first normally open switch switching said switchable rectifier on, and momentarily closing of said second normally open switch switching said switchable rectifier off.

References Cited by the Examiner
UNITED STATES PATENTS
2,352,240  6/44  Wolfner _____ 328—21
FOREIGN PATENTS
442,747  2/36  Great Britain.
OTHER REFERENCES
Application and Circuit Design Notes, Solid State Products Inc. Bulletin D420–02, December 1959.

ARTHUR GAUSS, *Primary Examiner.*